(12) United States Patent
Ladvanszky et al.

(10) Patent No.: US 9,025,690 B2
(45) Date of Patent: May 5, 2015

(54) APPARATUS FOR PERFORMING CHANNEL EQUALIZATION ON A MIMO SIGNAL

(75) Inventors: Janos Ladvanszky, Pomaz (HU); Gabor Kovacs, Budapest (HU); Anna Rhodin, Pixbo (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 14/008,787

(22) PCT Filed: Apr. 1, 2011

(86) PCT No.: PCT/EP2011/055098
§ 371 (c)(1),
(2), (4) Date: Sep. 30, 2013

(87) PCT Pub. No.: WO2012/130327
PCT Pub. Date: Oct. 4, 2012

(65) Prior Publication Data
US 2014/0016687 A1    Jan. 16, 2014

(51) Int. Cl.
*H04B 7/02* (2006.01)
*H04B 7/04* (2006.01)
*H04L 25/03* (2006.01)

(52) U.S. Cl.
CPC ........ *H04B 7/0413* (2013.01); *H04L 25/03159* (2013.01); *H04L 25/03273* (2013.01); *H04L 25/0328* (2013.01); *H04L 2025/03426* (2013.01)

(58) Field of Classification Search
USPC .......................... 375/267, 316, 347; 370/334
See application file for complete search history.

(56) References Cited

U.S. PATENT DOCUMENTS

| 7,545,891 | B1 | 6/2009 | Pare, Jr. et al. |
| 7,697,596 | B2 * | 4/2010 | Li et al. ................ 375/148 |
| 8,699,612 | B1 * | 4/2014 | Chiu ..................... 375/267 |
| 2008/0101496 | A1 * | 5/2008 | Gaikwad ............... 375/267 |

OTHER PUBLICATIONS

Kim, J-H, et al., "Frequency Domain-DFE Coupled with Common Phase Error Tracking Loop in OFDM Systems", 2005 IEEE 61st Vehicular Technology Conference, VTC2005, Spring, May 30-Jun. 1, 2005, Stockholm, Sweden, IEEE, Piscataway, NJ, USA, vol. 2, May 30, 2005, pp. 1248-1252, XP010855611.

* cited by examiner

*Primary Examiner* — Ted Wang
(74) *Attorney, Agent, or Firm* — Rothwell, Figg, Ernst & Manbeck, P.C.

(57) ABSTRACT

The present invention relates to a receiver in a 2×2 Line of Sight Multiple Input Multiple Output, LoS MIMO, system. The receiver is arranged to estimate a first ($\hat{S}_1$) and a second ($\hat{S}_2$) signal on the basis of a first ($r_1(t)$) and a second ($r_2(t)$) signal received from respective first and second transmitters (Tx1,Tx2). Said received signals ($r_1(t)$, $r_2(t)$ comprises a first and second signal. The receiver comprises a first Phase Locked Loop (11), PLL, and a second PLL (12), which are arranged to respectively determine a first (In1) and second (In2) demodulated signal from the first ($r_1(t)$) and the second ($r_2(t)$) received signals. The receiver further comprises an equalizer (13) which is arranged to estimate the first ($\hat{S}1$) and second ($\hat{S}2$) signals from the demodulated signals (In1,In2). The receiver is particularly characterized in that the equalizer (13) further is arranged to compensate for an independent rotation frequency ftr2−ftr1, where ftr1 and ftr2 are the respective deviations from the nominal frequency values of a first and a second transmitted signals comprising the first and second signals.

9 Claims, 3 Drawing Sheets

16 — The receiver comprises a first Phase Locked Loop, PLL, and a second PLL, which respectively determines a first (In1) and a second (In2) demodulated signal (In1,In2) from the first ($r_1(t)$) and the second ($r_2(t)$) received signals.

17 — The receiver further comprises an equalizer which is arranged to estimate a first ($\hat{s}_1$) and second ($\hat{s}_2$) signals from the demodulated signals (In1,In2).

18 — The equalizer further being arranged to compensate for an independent rotation frequency ftr2 − ftr1, where ftr1 and ftr2 are the respective deviations from the nominal frequency values of a first ($s_1(t)$) and a second ($s_2(t)$) transmitted signals comprising the first ($s_1$) and second ($s_2$) signals.

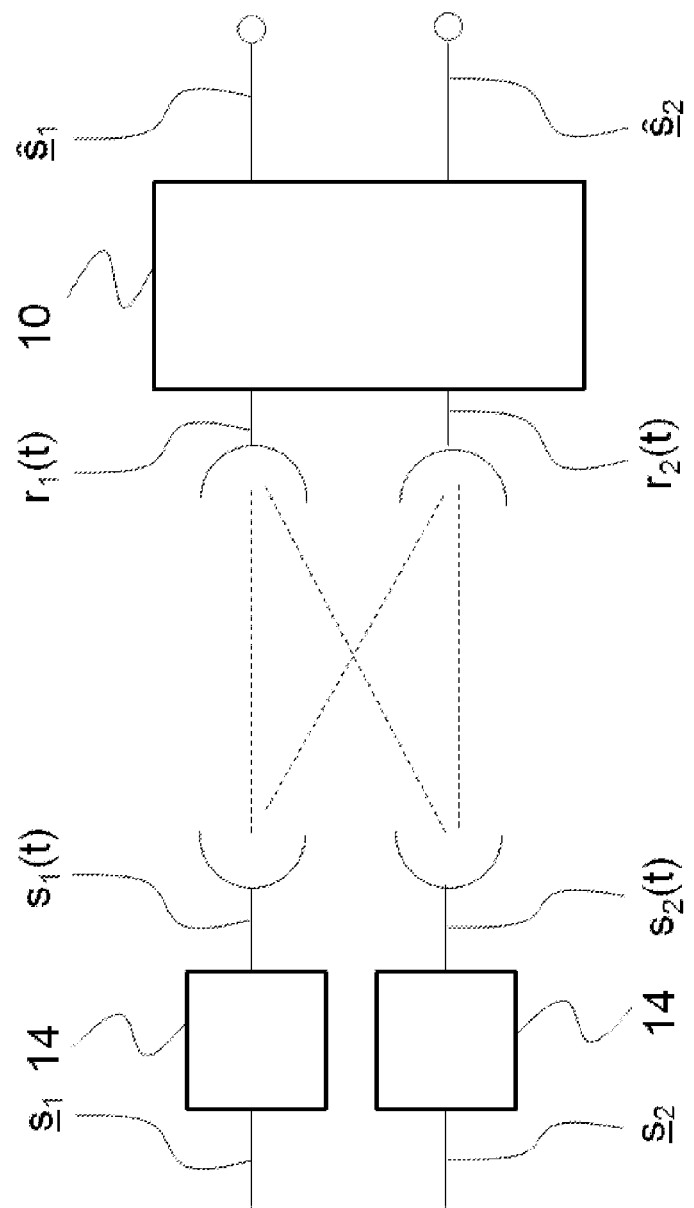

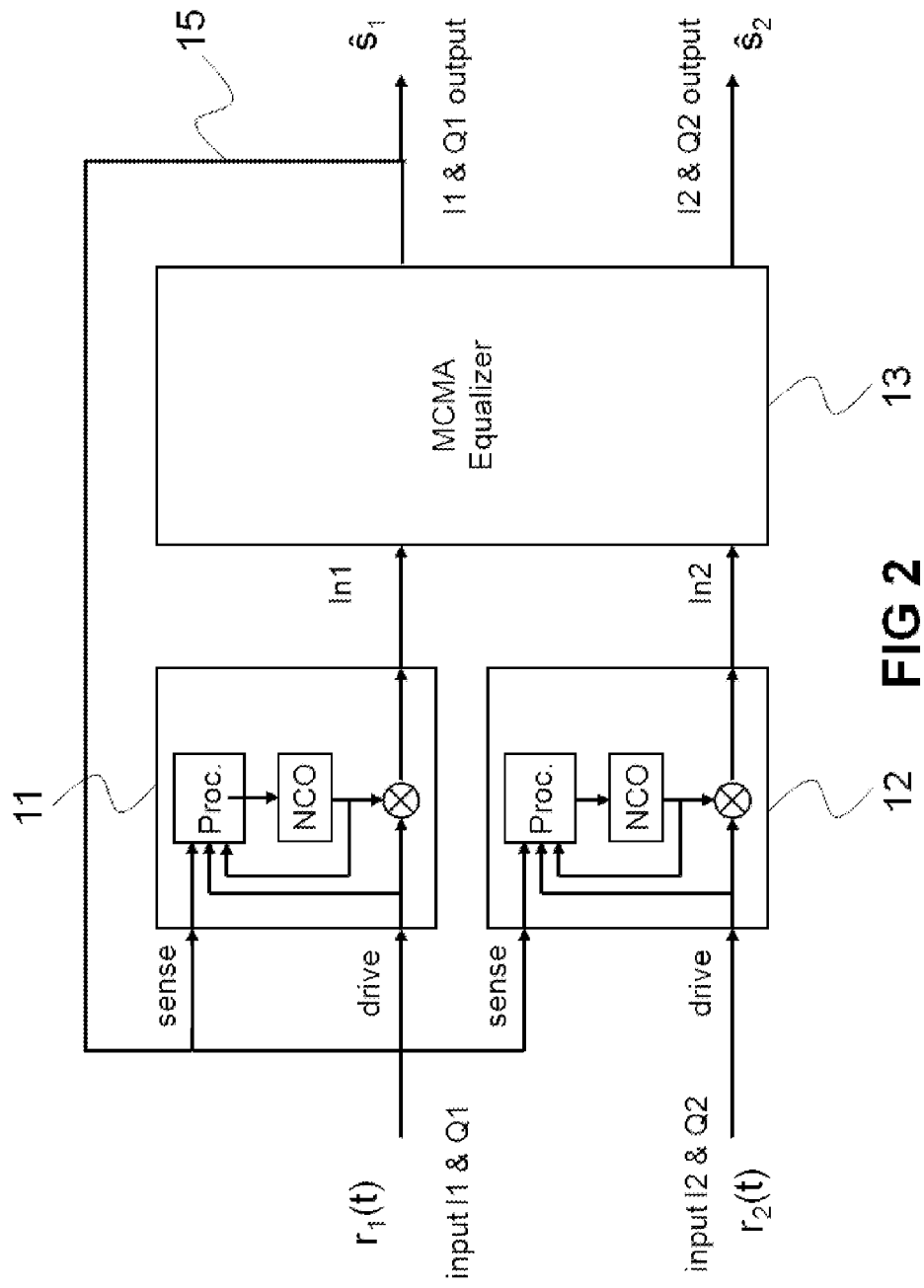

16 — The receiver comprises a first Phase Locked Loop, PLL, and a second PLL, which respectively determines a first (In1) and a second (In2) demodulated signal (In1,In2) from the first ($r_1(t)$) and the second ($r_2(t)$) received signals.

17 — The receiver further comprises an equalizer which is arranged to estimate a first ($\hat{s}_1$) and second ($\hat{s}_2$) signals from the demodulated signals (In1,In2).

18 — The equalizer further being arranged to compensate for an independent rotation frequency ftr2 − ftr1, where ftr1 and ftr2 are the respective deviations from the nominal frequency values of a first ($s_1(t)$) and a second ($s_2(t)$) transmitted signals comprising the first ($s_1$) and second ($s_2$) signals.

FIG 3

APPARATUS FOR PERFORMING CHANNEL EQUALIZATION ON A MIMO SIGNAL

CROSS-REFERENCE TO RELATED APPLICATION

This application is a 35 U.S.C. §371 National Phase Entry Application from PCT/EP2011/055098, filed Apr. 1, 2011, and designating the United States.

TECHNICAL FIELD

The present invention relates to a receiver in a 2×2 Line of Sight, LoS, MIMO system, the receiver being arranged to estimate a first and a second transmitted signal from respective first and second transmitters. The present invention also relates to a method performed in said receiver.

BACKGROUND

LoS MIMO (Line-of Sight Multiple-Input-Multiple-Output) technology is used to increase the capacity of fixed microwave links utilizing the spatial diversity of multiple antennas transmitting independent data streams in the same frequency band.

Input data streams are normally modulated at the transmitter side using QAM (Quadrature Amplitude Modulation), which is a digital modulation/demodulation scheme. An amplitude-shift keying suppressed carrier (ASK-SC) digital modulation scheme is preferably used. The digital data streams are conveyed by modulating the amplitude of two carrier waves. The waves are out of phase with each other by 90 degrees and are called quadrature carriers/components. The modulated waves are summed and the result waveform is a combination of both phase-shift keying (PSK) and ASK.

The task of the LoS MIMO receiver is the separation of the input data streams at the receiver side by equalizing the effect of the microwave channel. When demodulating the waveform, phase tracking is a known method used in QAM. A carrier recovery loop is often used for enabling a coherent demodulation of high order QAM constellations. In order to improve the phase tracking performance, "pilot" symbols of lower constellation order are periodically inserted, such as for instance 4 QAM symbols. Pilot symbols of higher constellation order may be used for higher order QAM constellation demodulation. For synchronization, the best known method uses the pilot signal and FFT (Fast Fourier Transformation) to determine frequency deflections, but it is time and power consuming.

There are several know equalizer algorithms, such as LMS (Least Mean Square), CMA (Constant Modulus Algorithm) and MCMA (Modified Constant Modulus Algorithm). However, these algorithms operate properly only if the local oscillator frequencies are identical at transmitter and receiver side respectively (frequency locking). If this is not provided, the equalizer has to be amended with appropriate synchronization algorithms. For synchronization, the best known method uses pilot signal and FFT to determine frequency deflections, but it is time and power consuming.

There are existing receiver architectures comprising two PLL's and an equalizer, but locking for the correct spectrum lines can only be assured manually.

Consequently, there are no fully automated solutions for locking at the correct spectrum lines and pilot signals needs to be used. Moreover, FFT is time and computation power consuming. Finally, equalization often needs complicated matrix operations.

SUMMARY

The object of the present invention is therefore to provide receiver architecture enabling fully automatic locking at the correct spectrum lines.

The object of the present invention is achieved by means of a receiver in a 2×2 Line of Sight Multiple Input Multiple Output, LoS MIMO, system. The receiver is arranged to estimate a first and a second signal on the basis of a first and a second signal received from respective first and second transmitters, said received signals comprising a first and second signal. The receiver comprises a first Phase Locked Loop, PLL, and a second PLL, which are arranged to respectively determine first and second demodulated signals from the first and the second received signals. The receiver further comprises an equalizer which is arranged to estimate the first and second signals from the demodulated signals.

What particularly characterizes the equalizer is that it is further arranged to compensate for an independent rotation frequency ftr2−ftr1, where ftr1 and ftr2 are the respective deviations from the nominal frequency values of a first and a second transmitted signals comprising the first and second signals.

The object is further achieved by means of Method for a receiver in a 2×2 Line of Sight Multiple Input Multiple Output, LoS MIMO, system. The receiver estimates a first and a second signal on the basis of a first and a second signal received from respective first and second transmitters. Said received signals comprise a first and second signal. The method further comprises the steps of:

The receiver comprises a first Phase Locked Loop, PLL, and a second PLL, which respectively determines a first and second demodulated signal from the first and the second received signals.

The receiver further comprises an equalizer which estimates the first and second signals from the demodulated signals.

The method is particularly characterized in that the equalizer further compensates for an independent rotation frequency ftr2−ftr1, where ftr1 and ftr2 are the respective deviations from the nominal frequency values of a first and a second transmitted signal comprising the first and second signals.

Several advantages are obtained by means of the present invention. For example, a receiver is provided which enables fully automatic locking at the correct spectrum lines. Moreover, the PLLs follow the changes of the transmitter and receiver frequencies, thereby providing error-free communication. Furthermore, with this receiver architecture, a pilot signal is no longer needed. Finally, the equalizer needs fewer multiplications than the most existing solutions, which means that it is faster and easier to implement.

BRIEF DESCRIPTION OF THE DRAWINGS

The present invention will now be described more in detail with reference to the appended drawings, where:

FIG. 1 shows a schematic view of a system into which the present invention may be implemented.

FIG. 2 shows a receiver architecture according to the present invention.

FIG. 3 shows a flow chart of a method according to the present invention.

DETAILED DESCRIPTION

In the following, a receiver example will be described. Said receiver comprises means arranged to perform certain procedures or method step. It should therefore be understood by a person skilled in the art that the example also illustrates a method in the receiver for performing said steps.

FIG. 1 shows a schematic view of a system into which the present invention may be implemented. A transmitter (not shown in whole) comprises means 14 arranged to convert a first $s_1$ and second $s_2$ signal into a first ($s_1(t)$) and a second ($s_2(t)$) frequency signal, which are transmitted from respective antennas.

The receiver 10 is a 2×2 Line of Sight Multiple Input Multiple Output, LoS MIMO, system. The receiver 10 is arranged to estimate a first ($\hat{s}_1$) and a second ($\hat{s}_2$) signal on the basis of a first ($r_1(t)$) and a second ($r_2(t)$) signal received from respective first and second transmitters (Tx1,Tx2). The estimated signals ($\hat{s}_1,\hat{s}_2$) are the receiver determination of the first ($s_1$) and second ($s_2$) signals. Since the first ($s_1(t)$) and a second ($s_2(t)$) transmitted are mixed in the air, said received signals ($r_1(t)$, $r_2(t)$) comprises both the first ($s_1$) and second ($s_2$) signals.

FIG. 2 shows a receiver architecture according to the present invention. The receiver as shown in FIG. 2 comprises a first Phase Locked Loop 11, PLL, and a second PLL 12, which are arranged to respectively determine 16 (see FIG. 3) a first In1 and a second In2 demodulated signals from the first ($r_1(t)$) and the second ($r_2(t)$) received signals. The receiver further comprises an equalizer 13, which is arranged to estimate the first $\hat{s}_1$ and second $\hat{s}_2$ signals from the demodulated signals In1,In2.

Existing receiver architectures normally comprises two PLL's 11,12 and an equalizer 13, but locking for the correct spectrum lines can only be assured manually. Consequently, there is a need to provide a fully automated solution for locking at the correct spectrum lines where pilot signals no longer needs to be used.

In order to solve this problem, the equalizer 13 is further arranged to compensate 18 (see FIG. 3) for an independent rotation frequency ftr2−ftr1. The rotation frequencies ftr1 and ftr2 are respective deviations from the nominal frequency values of a first ($s_1(t)$) and a second ($s_2(t)$) transmitted signals comprising the first ($s_1$) and second ($s_2$) signals.

In this receiver, no pilot signal is necessary. The spectral components in the received signals are sufficient for compensation of all the rotations of the constellation diagrams, and for the selection of the appropriate spectrum line. The PLL's are arranged to lock to and compensate for two independent rotation frequencies while the equalizer is arranged to compensate for one independent rotation frequency. Consequently, there are exactly three independent rotation frequencies, which have to be compensated.

As mentioned earlier, the equalizer 13 compensates for an independent rotation frequency ftr2−ftr1. The first and the PLL 11,12 lock to and compensate for the independent rotation frequencies ftr1+frx1 and ftr1+frx2 respectively. The rotation frequencies frx1 and frx2 are the deviations from the nominal frequency values of the first ($r_1(t)$) and the second ($r_2(t)$) received signals respectively.

As shown in FIG. 2, the PLL's 11,12 are arranged to receive the first ($s_1(t)$) and the second ($s_2(t)$) transmitted signals combined. Each PLL then identifies one of the rotation frequencies and performs a backward rotation. The equalizer 13 is arranged to cancel the rotation frequency for the first ($s_1(t)$) transmitted signal and compensate the rotation frequency of the second ($s_2(t)$) transmitted signal. As shown in FIG. 2, the equalizer 13 generates a reference signal 15 for both PLL's, which is obtained from the same output of the equalizer.

The PLL's 11,12 are arranged to determine the rotation of a constellation diagram for the first ($r_1(t)$) and the second ($r_2(t)$) received signals on the basis of the signal received on a drive input on the PLL. The PLL's are further arranged to compare the rotation with a Numerically Controlled Oscillator output to produce a phase error signal. The phase error signal is added to a drive input.

The PLLs 11,12 has a drive and a sense input, see FIG. 2. From the drive input the rotation of the constellation is determined. This rotation is compared to the NCO (Numerically Controlled Oscillator) output to produce a phase error signal. The sense input is added to the phase error signal in order to ensure the locking to the right frequency component.

The invention is not limited to the examples above, but may vary freely within the scope of the appended claims. The equalizer algorithm consists basically of four independent SISO MCMA equalizer thus avoiding complicated matrix operations. Constants in the formulation of the error function are chosen the highest possible that can still avoid spurious operation. Filter tap number may be adjusted to cover a small integer multiply of the symbol time. Initial values of weights are given at the oldest time steps of every symbols.

With this receiver, a solution is provided which enables fully automatic locking at the current spectrum lines. Moreover, the PLLs follow the changes of the transmitter and receiver frequencies, thereby providing error-free communication. Furthermore, with this receiver architecture, a pilot signal is no longer needed. Finally, the equalizer needs fewer multiplications than the most existing solutions, which means that it is faster and easier to implement.

The invention claimed is:

1. A receiver in a 2×2 Line of Sight (LoS) Multiple Input Multiple Output (MIMO) system, the receiver being arranged to estimate a first ($\hat{s}1$) and a second ($\hat{s}2$) signal on the basis of a first ($r1(t)$) and a second ($r2(t)$) signal received from respective first and second transmitters (Tx1,Tx2), said received signals ($r1(t)$, $r2(t)$) comprising a first (s1) and second (s2) signal, the receiver comprising a first Phase Locked Loop (PLL) and a second PLL, which are arranged to respectively determine a first (In1) and second (In2) demodulated signal from the first ($r1(t)$) and the second ($r2(t)$) received signals, the receiver further comprising an equalizer which is arranged to estimate the first ($\hat{s}1$) and second ($\hat{s}2$) signals from the demodulated signals (In1,In2), wherein the equalizer further being arranged to compensate for an independent rotation frequency ftr2-ftr1, where ftr1 and ftr2 are the respective deviations from the nominal frequency values of a first ($s1(t)$) and a second ($s2(t)$) transmitted signals comprising the first (s1) and second (s2) signals.

2. The receiver according to claim 1, wherein the PLL's are arranged to lock to and compensate for two independent rotation frequencies while the equalizer is arranged to compensate for one independent rotation frequency.

3. The receiver according to claim 2, wherein the PLL's are arranged to compare the rotation with a Numerically Controlled Oscillator output to produce a phase error signal, wherein the phase error signal is added to a drive input.

4. The receiver according to claim 1, wherein the PLL's are arranged to receive the first ($s1(t)$) and the second ($s2(t)$) transmitted signals combined, wherein each PLL identifies one rotation frequency and performs a backward rotation.

5. The receiver according to claim 1, wherein the equalizer is arranged to cancel the rotation frequency for the first ($s1(t)$)

transmitted signal and compensate the rotation frequency of the second (s2(t)) transmitted signal.

6. The receiver according to claim 1, wherein a reference signal of both PLL's is obtained from the same output of the equalizer.

7. The receiver according to claim 1, wherein the PLL's are arranged to determine the rotation of a constellation diagram for the first (r1(t)) and the second (r2(t)) received signals on the basis of the signal received on a drive input on the PLL.

8. The receiver according to claim 1, wherein the first and the PLL (11,12) are arranged to lock to and compensate for the independent rotation frequencies ftr1+frx1 and ftr1+frx2 respectively, where frx1 and frx2 are the deviations from the nominal frequency values of the first (r1(t)) and the second (r2(t)) received signals respectively.

9. A method for use in a communication system, the method comprising:

estimating, by a receiver of a 2×2 Line of Sight (Los) Multiple Input Multiple Output (MIMO) system, a first (ŝ1) and a second (ŝ2) signal on the basis of a first (r1(t)) and a second (r2(t)) signal received from respective first and second transmitters (Tx1,Tx2), said received signals (r1(t), r2(t)) comprising a first (s1) and second (s2) signal, determining, by a first Phase Locked Loop (PLL) and a second PLL, respectively, of said Los MIMO system, a first (In1) and second (In2) demodulated signal from the first (r1(t)) and the second (r2(t)) received signals, estimating, by an equalizer of said LoS MIMO system, the first (ŝ1) and second (ŝ2) signals from the demodulated signals (In1,In2), and compensating, by the equalizer, for an independent rotation frequency ftr2-ftr1, where ftr1 and ftr2 are the respective deviations from the nominal frequency values of a first (s1(t)) and a second (s2(t)) transmitted signal comprising the first (s1) and second (s2) signals.

* * * * *